(12) United States Patent
Hofmann et al.

(10) Patent No.: US 9,057,406 B2
(45) Date of Patent: Jun. 16, 2015

(54) PART-BEARING-RING, SECURING SLEEVE, ROLLING-ELEMENT BEARING, AND MOUNTING METHOD

(75) Inventors: Matthias Hofmann, Schweinfurt (DE); Henning Kern, Schweinfurt (DE); Holger Kristandt, Euerbach (DE); Baozhu Liang, Dittelbrunn-Hambach (DE); Edgar Pickel, Sommerach (DE); Ingo Schulz, Gerolzhofen (DE)

(73) Assignee: AKTIEBOLAGET SKF, Gothenburg (SE)

( * ) Notice: Subject to any disclaimer, the term of this patent is extended or adjusted under 35 U.S.C. 154(b) by 36 days.

(21) Appl. No.: 13/981,112

(22) PCT Filed: Jan. 26, 2012

(86) PCT No.: PCT/EP2012/051216
§ 371 (c)(1),
(2), (4) Date: Oct. 14, 2013

(87) PCT Pub. No.: WO2012/101209
PCT Pub. Date: Aug. 2, 2012

(65) Prior Publication Data
US 2014/0029886 A1    Jan. 30, 2014

(30) Foreign Application Priority Data
Jan. 28, 2011   (DE) .......................... 10 2011 003 292

(51) Int. Cl.
*F16C 43/04*    (2006.01)
*F16C 33/60*    (2006.01)
*F16C 19/38*    (2006.01)
*F16C 41/04*    (2006.01)
*F16B 5/02*    (2006.01)

(52) U.S. Cl.
CPC .......... *F16C 33/60* (2013.01); *Y10T 29/49689* (2015.01); *F16C 19/386* (2013.01); *F16C 41/04* (2013.01); *F16C 2300/14* (2013.01); *F16B 5/02* (2013.01); *F16C 43/04* (2013.01)

(58) Field of Classification Search
CPC ..... F16C 33/60; F16C 33/605; F16C 2226/62
USPC .......... 384/499, 501, 502, 504–506, 537, 585
See application file for complete search history.

(56) References Cited

U.S. PATENT DOCUMENTS 3,361,500 A * 1/1968 Pohler ........................... 384/569
3,651,550 A * 3/1972 Bennett ...................... 29/898.09
4,030,786 A * 6/1977 Schluter et al. ............... 384/453

(Continued)

FOREIGN PATENT DOCUMENTS

DE    416839 A    7/1925
DE    16006 A1    12/1958

(Continued)

*Primary Examiner* — Phillip A Johnson
(74) *Attorney, Agent, or Firm* — Bryan Peckjian; SKF USA Inc. Patent Dept.

(57) ABSTRACT

A part-bearing-ring of a rolling-element bearing includes first and second assembly bores on its end surface, and the second assembly bore has a larger diameter than the first assembly bore so that it can accommodate a securing sleeve. The second assembly bore may include an internal thread for attaching the securing sleeve. Also a bearing ring formed of two part-bearing-rings and a securing sleeve and a method of installing a bearing ring.

12 Claims, 7 Drawing Sheets

(56) References Cited

U.S. PATENT DOCUMENTS

| | | | |
|---|---|---|---|
| 4,425,009 A | | 1/1984 | Fillon |
| 4,591,212 A | * | 5/1986 | Balken et al. ............... 301/105.1 |
| 4,797,008 A | * | 1/1989 | Helbig et al. .................... 384/49 |
| 4,865,472 A | * | 9/1989 | Jacob ............................ 384/503 |
| 6,406,188 B1 | * | 6/2002 | Lin et al. ....................... 384/504 |

FOREIGN PATENT DOCUMENTS

| | | |
|---|---|---|
| DE | 1976014 U | 12/1967 |
| DE | 2654607 A1 | 6/1978 |
| DE | 3400539 A1 | 7/1985 |
| DE | 4102455 A1 | 7/1992 |
| DE | 10044173 A1 | 5/2001 |
| EP | 1020652 A2 | 7/2000 |
| EP | 1302683 A2 | 4/2003 |
| EP | 1760339 A2 | 3/2007 |
| GB | 682531 A | 11/1952 |
| GB | 2361276 A | 10/2001 |
| JP | 02304216 A | 12/1990 |
| JP | 2006144829 A | 6/2006 |

* cited by examiner

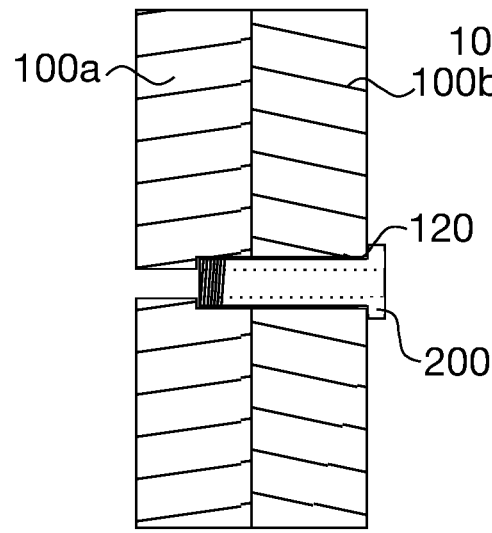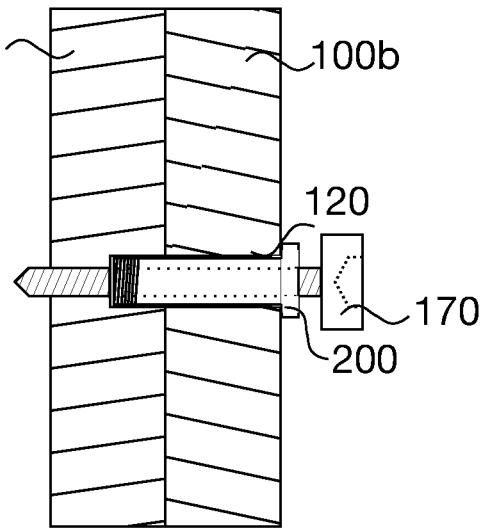
Fig. 3a  Fig. 3b
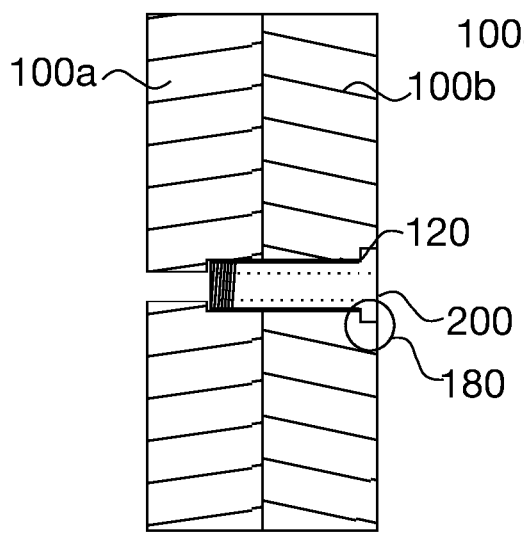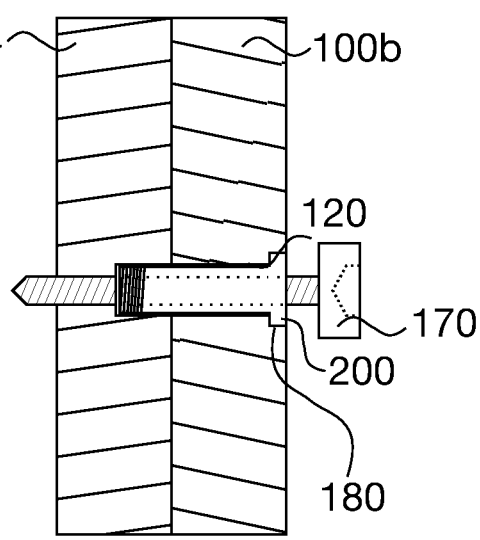
Fig. 3c  Fig. 3d

PART-BEARING-RING, SECURING SLEEVE, ROLLING-ELEMENT BEARING, AND MOUNTING METHOD

CROSS-REFERENCE

This application is a U.S. national Stage of International Application No. PCT/EP2012/051216 filed on Jan. 26,2012, which claims priority to German patent application Ser. No. 10 2011 003 292.4 filed on Jan. 28,2011.

The present invention relates to rolling-element bearings, in particular rolling element bearings which are assembled at their location of use and thus are manufactured in individual components.

RELATED ART

FIG. 4 schematically shows the conventional construction of a rolling-element bearing 300. The rolling-element bearing 300 is composed of a split inner ring (also IR from the English "inner ring"), whose upper part-bearing-ring is designated in FIG. 4 with 310, and a split outer ring 320 (also OR from the English "outer ring"). Both the inner ring and the outer ring 320 exhibit assembly bores, which are designated in FIG. 4 with reference numbers 315 and 325. Using the example of the inner ring, FIG. 4 further shows that the inner ring is composed of two part-bearing-rings 310, 335, wherein one part-bearing-ring 310 can be seen in the foreground, and one part-bearing-ring 335 can be seen in the background. Further, in the example shown in FIG. 4, it is also understood that the outer ring 320 is split, which can be seen from the dividing lines in the assembly bores 325. In the context of the conventional art, it is usual to design bearings with split bearing inner rings and/or bearing outer rings. This applies in particular to rolling-element bearings which are assembled at, or put together proximal to, their location of use.

FIG. 5 shows a further example of a conventional rolling-element bearing, wherein a double row tapered roller bearing is shown here. FIG. 5 shows a radial cross-section through the bearing. In FIG. 5 it can be seen that the bearing is comprised of a bearing outer ring 320 and a split bearing inner ring, which is composed of the part-bearing-rings or bearing halves 310 and 335. Two rows of rolling elements 340 are shown therebetween. In addition, FIG. 5 shows the assembly bore 315, which extends across both part-bearing-rings 310 and 335. The two part-bearing-rings 310 and 335 can be clamped together with each other by this assembly bore 315 using screws, and assembled at their location of use.

In other words, there are application variants of rolling-element bearings wherein the assembly bores are used both for the assembly of the bearing in itself, as well as for mounting of the entire bearing on a carrier, for example a housing of a motor or of a transmission. In these application cases, bearings with split bearing rings cannot be preassembled with the aid of the assembly bores, since they are provided for the final mounting.

In bearings having a split OR (outer ring) or IR (inner ring), there is therefore the problem that they must be secured for transporting or also for mounting. The assembly bores, which are designated with 315 and 325 in FIG. 4, must remain free for the actual mounting, such as for example on the housing of a motor or a transmission. At the same time, during transport or mounting, the bearing rings must be prevented from falling apart.

Hitherto this problem was solved by complex devices which must be removed shortly before the mounting. Here, for example, brackets are used. However, in new mounting processes the early removal of the assisting devices is no longer possible, so that they can no longer be used. Other solutions provide additional bores between the actual assembly bores 315, or 325, which additional bores are provided in particular for transport-securing. In FIG. 4 a bridge is identified with reference number 330. This lies in a gap between two assembly bores, wherein in FIG. 4 the bearing inner ring 310 serves as example. In the gaps between the screw holes/assembly bores, additional, usually smaller, screws are then inserted, which hold together the two split OR or IR for transport or mounting. In heavily-loaded connections, however, the gap is so small that this solution cannot be applied.

SUMMARY OF THE INVENTION

It is therefore an aspect of the present invention to provide an improved arrangement for securing rolling-element bearings which have split bearing rings.

It is a core concept of the present invention to use the through-bore or the assembly bore of the attachment screws of a part-bearing-ring or of a bearing ring half itself as a space for a securing. Individual through-holes or assembly bores can be designed larger for this purpose, so that for example a securing sleeve can be inserted. This securing sleeve can for example be attached in one of the rings, wherein different exemplary embodiments are conceivable for this purpose. For example, an attachment can take place using a thread in a part-bearing-ring, an additional nut which is inserted into the ring, a crimping or similar joining and re-shaping methods, even up to thermal shrink-fitting. In the other part-bearing-ring, the securing sleeve can for example be supported via a collar, similar to a screw head.

Moreover, by rotating the securing sleeve, the two part-bearing-rings can be clamped with each other like a screw, wherein other exemplary embodiments are also conceivable here. For example, the two part-bearing-rings can also be clamped by another device and the securing sleeve can be attached. The securing sleeve can here for example be screw-connected, staked, crimped, clamped, etc. After releasing the other device, the securing sleeve can take over the securing/fixing of the two part-bearing-rings to each other, and/or maintain their clamping.

In exemplary embodiments, the securing sleeve can have approximately an inner diameter of the original screw through-hole, i.e. have the diameter of a conventional assembly bore, so that the attachment of the bearing is substantially not affected by the securing sleeve. In exemplary embodiments, after mounting of the bearing, the securing sleeve can be secured in the thread with an adhesive, e.g. "Loctite," so that it cannot subsequently loosen again.

Exemplary embodiments can thus provide the advantage that an installation of the securing sleeve is no longer externally visible, or that despite the securing there are no protruding parts. Thus an influence of the actual screw-connection can be reduced in exemplary embodiments, or even can be completely absent. Moreover, the assembly process, in particular a screw-fastening process, can take place nearly uninfluenced by the securing sleeves. In exemplary embodiments, the advantage can thus result that, in an assembly process, a conventional screw-fastening process can be maintained unchanged, and any removal process of the transport-securing can be completely eliminated, since the securing sleeves remain in the assembly bores.

In exemplary embodiments, the securing sleeves remaining in the assembly bores can moreover entail an advantage in maintenance operations. In particular, during disassembly of the rolling-element bearing, the part-bearing-rings remain clamped to one another by the securing sleeves after removal of the assembly screws, so that the attachment of a securing device can also be foregone here. In particular, any possible maintenance personnel do not need to take any security precautions, since the securing sleeves continue to perform their securing function directly and automatically, even after disassembly of the bearing.

BRIEF DESCRIPTION OF THE DRAWINGS

Exemplary embodiments of the present invention are explained in the following in more detail with reference to the accompanying Figures.

FIGS. 3a-d show exemplary embodiments for an installed rolling-element bearing and the associated installation process;

DETAILED DESCRIPTION OF THE INVENTION

Figure 1:
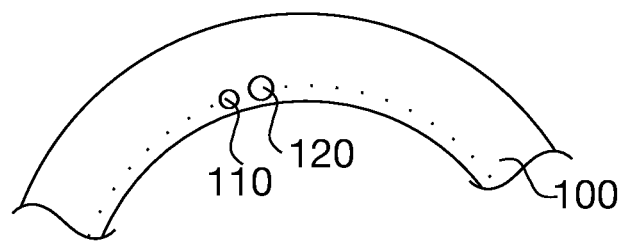
FIG. 1 shows an exemplary embodiment of a part-bearing-ring.

FIG. 1 shows an exemplary embodiment of a part-bearing-ring or of a bearing ring half 100 of a rolling-element bearing having a first assembly bore 110 on the end surface of the part-bearing-ring 100 and having a second assembly bore 120, wherein the second assembly bore 120 has a larger diameter than the first assembly bore 110 and is formed for accommodating a securing sleeve. The dotted line in FIG. 1 indicates that additional assembly bores can be provided, in particular a circumferential annulus of assembly bores can be provided.

In other words, exemplary embodiments comprise part-bearing-rings or bearing ring halves 100, which provide for an insertion of securing sleeves in their assembly bores 110, 120. For this purpose, individual assembly bores 120 can have a larger diameter than other assembly bores 110. Here an "assembly bore" should be understood to mean a bore which serves for assembling a plurality of, in particular two, part-bearing-rings with one another and/or for mounting a rolling-element bearing on a carrier, such as for example a housing of a motor, a generator, or a transmission.

In exemplary embodiments, the first assembly bore 110 and the second assembly bore 120 can be formed for mounting the part-bearing-ring 100 on a housing or on a rotor of a motor or of a generator. This can in particular include that assembly bores 110,120 provided in the part-bearing-ring 100 have the same geometry as assembly bores in a housing or a rotor, in particular those of a wind turbine.

The part-bearing-ring 100 can be formed as part of an inner ring or of an outer ring of a rolling-element bearing and/or can correspond to a half of a bearing ring which is split perpendicular to its axis of rotation. In one exemplary embodiment, two part-bearing-rings 100, which are friction-fit connected to each other axially, form an inner or outer ring of a rolling-element bearing.

Figure 2A:
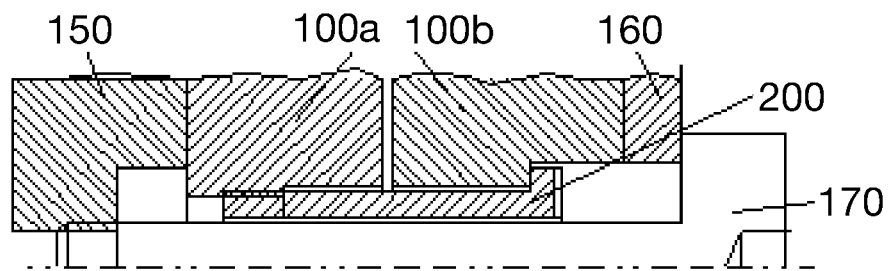
FIGS. 2a-c show exemplary embodiments of part-bearing-rings and securing sleeves.

FIG. 2a shows a schematic excerpt of an installed bearing ring. The bearing ring is assembled from an exemplary embodiment of a part-bearing-ring 100a and a further part-bearing-ring 100b. In exemplary embodiments, the further part-bearing-ring 100b can also be designed according to the above description. The two part-bearing-rings 100a, 100b are connected on the left side to a structural unit 150, which could for example be the housing or the rotor of a motor. On the right side, the two part-bearing-rings 100a, 100b are also connected to a structural unit 160; in exemplary embodiments this could for example correspond to a transmission housing. FIG. 2a shows, moreover, a securing sleeve 200, which holds the two part-bearing-rings 100a, 100b together.

Exemplary embodiments thus also comprise a securing sleeve 200 for securing a first part-bearing-ring 100a according to the above description to a second part-bearing-ring 100b, wherein the securing sleeve 200 is adapted for insertion into the second assembly bore 120 of the first part-bearing-ring 100a. For reasons of clarity, the second assembly bore 120 of the first part-bearing-ring 100a is not provided with a reference number. However, it is assumed therefrom that the securing sleeve 200 is located in the second assembly bore 120 of the part-bearing-ring 100a. On its axial ends the securing sleeve 200 has attachment means for attaching the securing sleeve 200 to the part-bearing-rings 100a, 100b.

In other words, the securing sleeve 200 is adapted to friction-fit connect the two part-bearing-rings 100a, 100b to each other such that they are secured for example during a transport or also during an installation. The actual installation of the secured part-bearing-rings 100a, 100b can then take place for example via assembly bores, wherein an assembly bore 170 is illustrated as an example in FIG. 2a.

In exemplary embodiments, the part-bearing-ring 100,100a can have an internal thread in the second assembly bore 120 for attaching the securing sleeve 200. In FIG. 2a one such exemplary embodiment is assumed. Moreover, in exemplary embodiments the securing sleeve 200 can have an external thread on one of its axial ends. This is also shown in FIG. 2a. In other words, in exemplary embodiments the securing sleeve 200 can be screwed into the second assembly bore 120 of a part-bearing-ring 100, 100a, so as to be friction-fit connected with it. Moreover, the securing sleeve 200 can have a collar on its other axial end, so as to also be friction-fit connected with the second part-bearing-ring 100b. FIG. 2a illustrates this case. Because the securing sleeve 200 is supported with its collar on the second part-bearing-ring 100b, and is engaged with its external thread in the first part-bearing-ring 100a, the two part-bearing-rings 100a, 100b can be clamped to each other.

In exemplary embodiments, a part-bearing-ring 100, 100b, as is also shown in FIG. 2, can have a shoulder, a recess, or a groove in the second assembly bore 120 for attaching a securing sleeve 200. Exemplary embodiments of part-bearing-rings 100,100b should not be limited here to these examples of attachment means or attachment possibilities.

In exemplary embodiments, the securing sleeve 200 can therefore have a collar on one axial end and an external thread or a clamping collar on another axial end for attaching to the part-bearing-rings 100a; 100b.

Figure 2B:
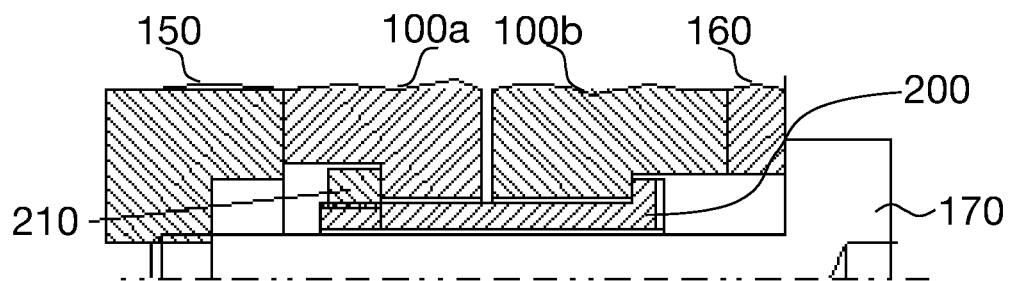

FIG. 2b illustrates a further exemplary embodiment. In FIG. 2b the two part-bearing-rings 100a, 100b, the structural units 150 and 160, and the securing sleeve 200 are shown. In contrast to the exemplary embodiment of FIG. 2a, in the exemplary embodiment of FIG. 2b the securing sleeve 200 is secured with a nut 210. In this exemplary embodiment the part-bearing-ring 100a therefore does not necessarily have an internal thread, but rather has a shoulder, a groove, or a recess on which the nut 210 can set. By tightening the nut 210, the two part-bearing-rings 100a, 100b can likewise be clamped to each other.

Figure 2C:
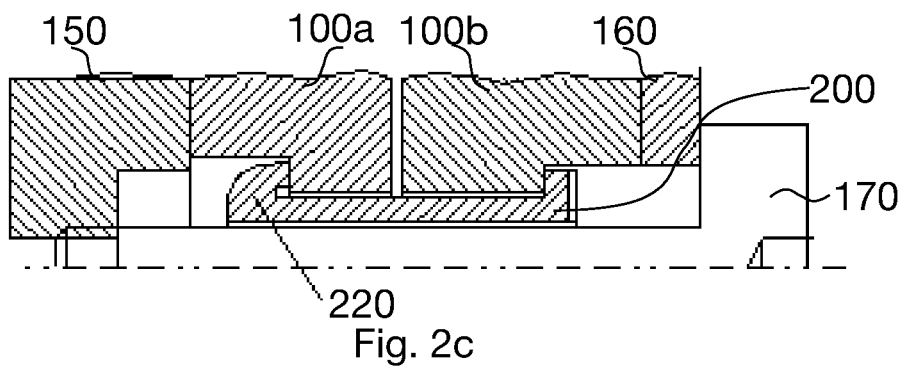

FIG. 2c shows a further exemplary embodiment. In FIG. 2c, the same components are shown which were already explained with reference to the FIGS. 2a, 2b. The exemplary embodiment of FIG. 2c differs from the previous exemplary embodiments in that the securing sleeve 200 is not screwed, but rather staked or crimped, which the crimping 220 in FIG. 2c shows. In this exemplary embodiment, the use of threads is completely dispensed with. The two part-bearing-rings 100a, 100b are radially brought together, a corresponding securing sleeve 200 is inserted into at least one assembly bore 120 of both part-bearing-rings 100a, 100b, and is subsequently crimped or staked. The two part-bearing-rings 100a, 100b are thereby clamped.

In exemplary embodiments, there are many different attachment possibilities for the securing sleeve 200 in a part-bearing-ring 100. In particular, during the manufacturing process of the part-bearing-rings 100, possibilities to profit from synergy effects present themselves. For example, manufacturing steps can be utilized wherein a heating of the part-bearing-rings occurs, in order to introduce the securing sleeves 200 into the heated and thereby expanded part-bearing-rings. They can then for example also be shrunk-fit. Here a part-bearing-ring 100 can be heated and/or a securing sleeve 200 can be cooled. Such an exemplary embodiment has the advantage that, apart from the appropriate choice of the inner diameter of the assembly bore and of the outer diameter of the securing sleeve 200, no further attachment means must be provided.

In exemplary embodiments, the securing sleeve 200 can have an inner diameter which substantially corresponds to that of the first assembly bore 110 of the first part-bearing-ring 100a. This results in that, after introducing and installing the securing sleeve 200, it in turn provides an assembly bore, which corresponds to the other assembly bore 110 which does not have a securing sleeve. In any installation at an actual location of use, the same screw connection can thereby be used as would also be used in conventional part-bearing-rings. However, additional devices for securing can be entirely dispensed with.

FIGS. 3a to 3d illustrate further exemplary embodiments. FIGS. 3a to 3d respectively show a first part-bearing-ring 100a and a part-bearing-ring 100b mounted axially thereto. A securing sleeve 200 is located in the second assembly bore 120 of the second part-bearing-ring 100b. In FIG. 3a it is additionally indicated that the securing sleeve 200 has an external thread, and the second assembly bore 120 has a corresponding internal thread in the first part-bearing-ring 100a. The securing sleeve 200 thus clamps the two part-bearing-rings 100a, 100b to each other. FIG. 3b additionally shows an assembly screw 170 which protrudes through the securing sleeve 200 and thus enables a mounting of the two mutually clamped part-bearing-rings 100a,100b for example on a housing or a rotor.

FIG. 3c once again shows the same components as were already explained with reference to FIGS. 3a and 3b. The exemplary embodiment of FIG. 3c differs in that the part-bearing-ring 100b has a recess or indentation 180, which allows a sinking of the securing sleeve 200 or of the collar of the securing sleeve 200. In exemplary embodiments, a part-bearing-ring 100a, 100b can thus have a recess for sinking a collar of the securing sleeve 200. This can entail the advantage that, after introducing the securing sleeve 200, the surface of the part-bearing-ring 100b has no protruding parts, but rather is flat. FIG. 3d again illustrates the installation case wherein an assembly screw 170 protrudes through the securing sleeve. In FIG. 3d it can be seen that the screw head of the assembly screw 170 can sit on the surface of the part-bearing-ring 100b, without mechanical displacements resulting from the securing sleeve 200.

Figure 3E:
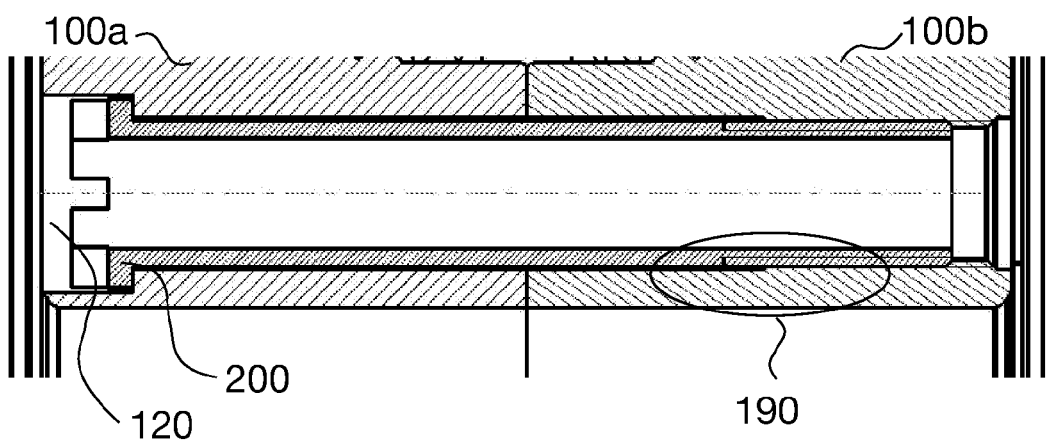
FIG. 3e shows a further exemplary embodiment for an installed rolling-element bearing and the associated installation process.

A further exemplary embodiment is shown in FIG. 3e. FIG. 3e again shows the two part-bearing-rings 100a, 100b, the assembly bore 120, and a securing sleeve 200 introduced therein. The securing sleeve 200 is clamped with the part-bearing-ring 100b in the region which is designated with 190 in FIG. 3e. This can again be effected in various ways; in FIG. 3e a counter-sleeve is indicated for this purpose. In other exemplary embodiments, conical bores, grooves, or slots for a locking mechanism, etc. would be conceivable.

As was already mentioned above, two part-bearing-rings 100a,100b, secured with friction-fit to each other via a securing sleeve 200, can form a bearing inner or bearing outer ring of a rolling-element bearing. Exemplary embodiments thus also comprise a bearing ring for a rolling-element bearing, which comprises at least one first part-bearing-ring 100 as described above, a second part-bearing-ring, and at least one securing sleeve 200 as described above, wherein the securing sleeve 200 is introduced into the second assembly bore 120 of the first part-bearing-ring 100 and into an assembly bore of the second part-bearing-ring, in order to clamp the two part-bearing-rings to each other via the securing sleeve 200.

Consequently, exemplary embodiments also include an entire rolling-element bearing, which comprises at least one bearing ring, which has a first part-bearing-ring 100, a second part-bearing-ring and a securing sleeve 200 for securing the first and the second bearing ring to each other.

Figure 3F:
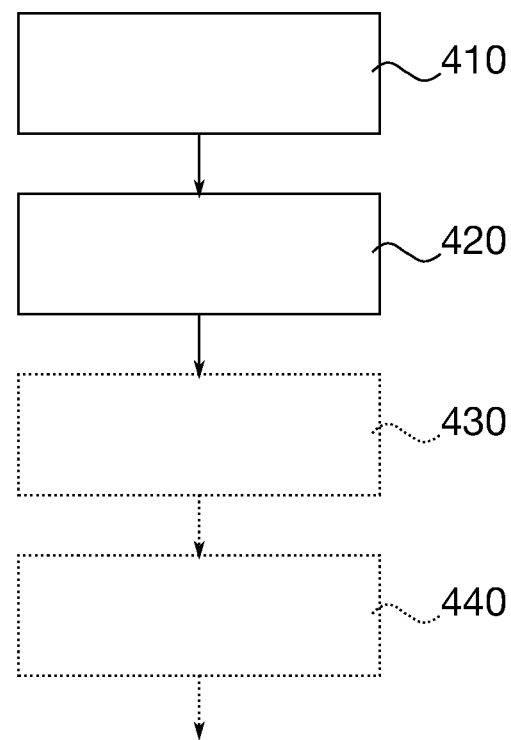
FIG. 3f shows an exemplary embodiment of a flowchart for an installation process.
Figure 4:
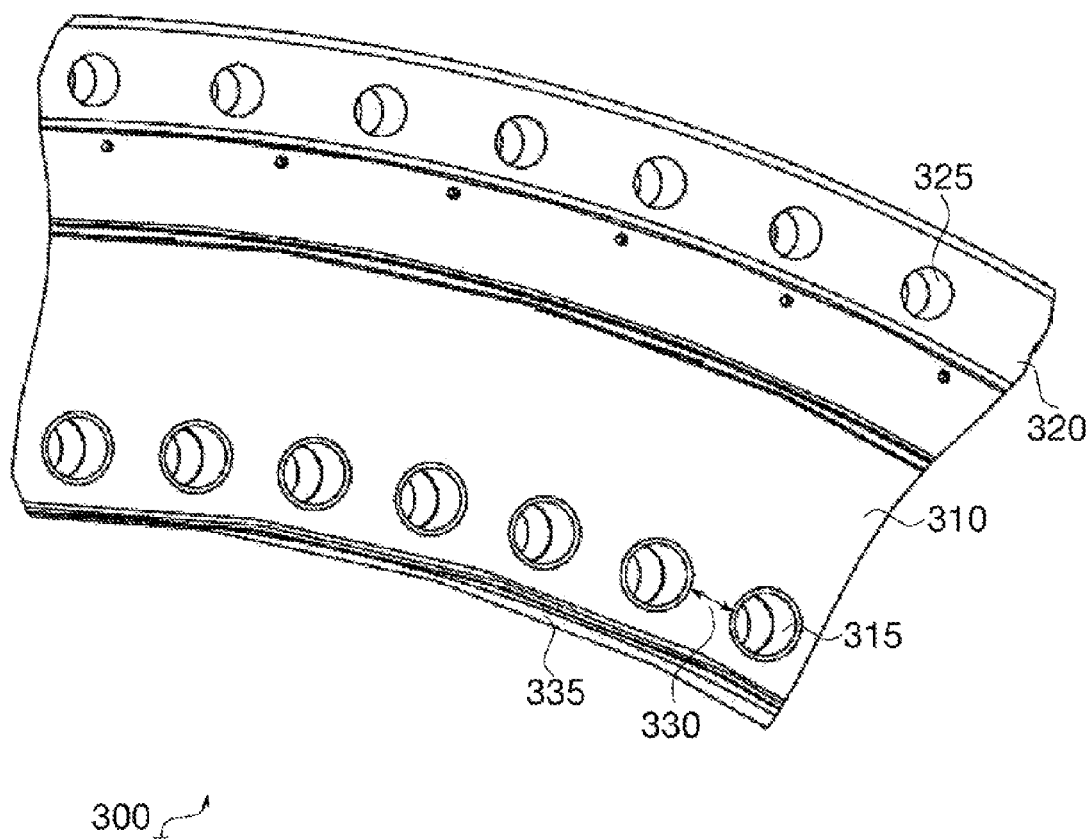
FIG. 4 shows an example of a rolling-element bearing, having split baring rings, from the prior art.
Figure 5:
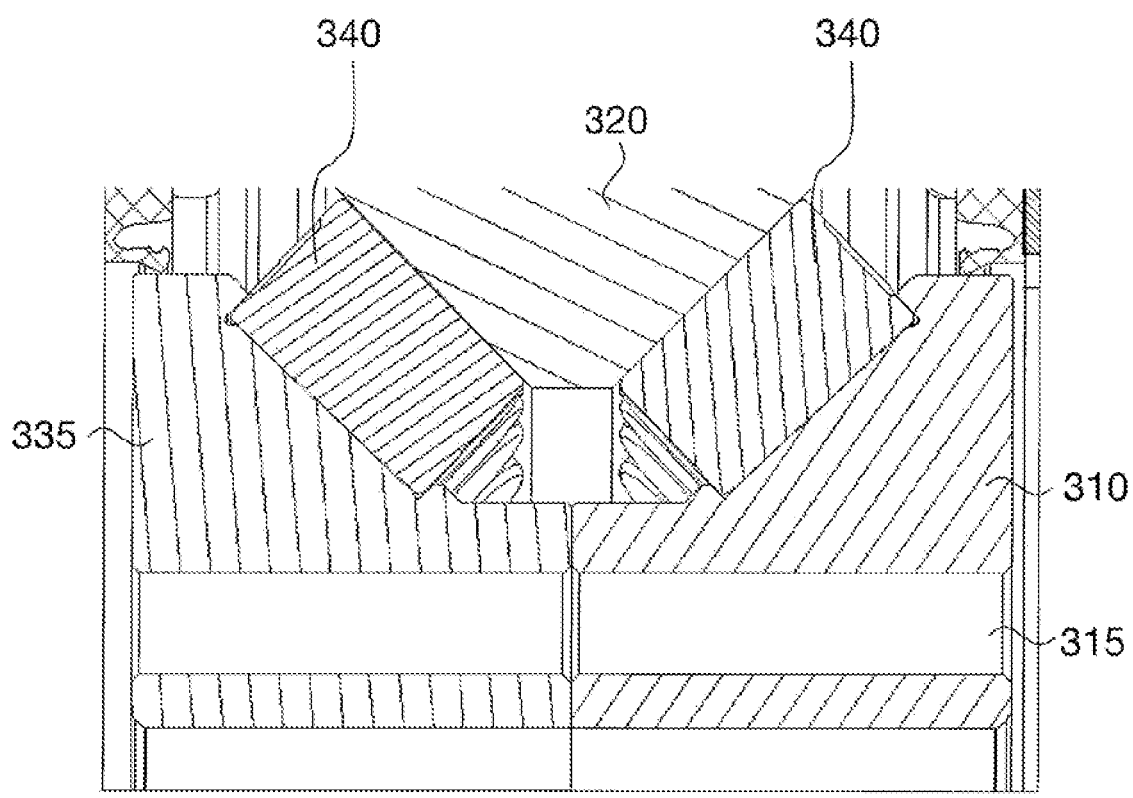
FIG. 5 shows a cross-section of a rolling-element bearing, having split bearing rings, from the prior art.

FIG. 3f illustrates an installation method for a bearing ring. The installation method comprises a step 410 of bringing-together a first part-bearing-ring 100a with a second part-bearing-ring, and a step 420 of inserting at least one securing sleeve 200 into an assembly bore 120 of the first part-bearing-ring 100a and into an assembly bore of the second part-bearing-ring. In exemplary embodiments, the method can optionally have further steps. In FIG. 3f, optional method steps are illustrated with dotted lines. Exemplary embodiments can thus comprise an additional step 430 of clamping the two part-bearing-rings with the securing sleeve. Moreover, in exemplary embodiments a further step 440 of installing the clamped part-bearing-rings can occur, using assembly bores 110,120 provided for this purpose in the clamped part-bearing-rings, and an assembly bore provided for this purpose in the securing sleeve 200.

Exemplary embodiments can offer the advantage that after introducing the securing sleeve, no installations are externally visible, or no protruding parts are present; compare FIGS. 3c and 3d. Moreover, exemplary embodiments can beneficially affect the installation, since an influence on the screw connection, the screw connection process and the performance of the bearing is substantially absent. Because the securing sleeve can remain in the bearing, in the case of removal it can directly and automatically perform its securing function, without a disassembler having to pay attention that, as with conventional concepts, the two part-bearing-rings loosen from each other after the removal of the bearing ring.

REFERENCE NUMBER LIST

100 Part-bearing-ring
100a Part-bearing-ring
100b Part-bearing-ring
110 First assembly bore
120 Second assembly bore 150 Structural unit for mounting
160 Structural unit for mounting
170 Assembly screw
180 Indentation
190 Clamping
200 Securing sleeve
210 Nut for securing sleeve
220 Crimping, staking
300 Bearing
310 Inner bearing-part-ring
315 Assembly bore
320 Bearing outer ring
325 Assembly bore
330 Bridge
335 Inner bearing-part-ring
340 Rolling-element bearing
410 Bringing together a first part-bearing-ring with a second part-bearing-ring
420 Inserting at least one securing sleeve into an assembly bore of the first part-bearing-ring and into an assembly bore of the second part-bearing-ring
430 Clamping the two part-bearing-rings with the securing sleeve
440 Mounting the clamped part-bearing-rings using assembly bores provided for this purpose in the clamped part-bearing-rings, and an assembly bore provided for this purpose in the securing sleeve

The invention claimed is:

1. A part-bearing-ring of a rolling-element bearing, the part-bearing-ring comprising:
    a first assembly bore on the end surface of the part-bearing-ring; and
    a second assembly bore, wherein the second assembly bore has a larger diameter than the first assembly bore and is formed for accommodating a securing sleeve, and wherein the part-bearing-ring has an internal thread in the second assembly bore for attaching the securing sleeve.

2. The part-bearing-ring according to claim 1, wherein the first assembly bore and the second assembly bore are formed for mounting the part-bearing-ring on a housing or on a rotor of a motor or of a generator.

3. The part-bearing-ring according to claim 1, wherein the part-bearing-ring is formed as part of an inner ring or of an outer ring of a rolling-element bearing and/or corresponds to a half of a bearing ring which is split perpendicular to its axis of rotation.

4. The part-bearing-ring according to claim 1, wherein the part-bearing-ring has a shoulder, a recess, or a groove in the second assembly bore for attaching the securing sleeve.

5. A bearing ring for a rolling-element bearing, which comprises at least one first part-bearing-ring according to the part-bearing ring of claim 1, a second part-bearing-ring, and at least one securing sleeve, wherein the securing sleeve is inserted into the second assembly bore of the first part-bearing-ring and into an assembly bore of the second part-bearing-ring, in order to clamp the two part-bearing-rings to each other via the securing sleeve.

6. The bearing ring according to claim 5, wherein the securing sleeve includes an external thread on an axial end.

7. The bearing ring according to claim 5, wherein the securing sleeve has an inner diameter substantially the same as an inner diameter of the first assembly bore of the first part-bearing-ring.

8. The bearing ring according to claim 5, wherein the securing sleeve has a collar on one axial end and a clamping collar on another axial end for attaching the first part-bearing-ring to the second part-bearing-ring.

9. The bearing ring according to claim 5, wherein the securing sleeve extends in the first part-bearing-ring and in the second part-bearing-ring.

10. The bearing ring according to claim 5, wherein the first assembly bore of the first part-bearing-ring is circumferentially spaced from the second assembly bore of the first part-bearing-ring on the end surface of the first part-bearing-ring.

11. The part-bearing-ring according to claim 1, wherein the first assembly bore is circumferentially spaced from the second assembly bore on the end surface of the part-bearing-ring.

12. Installation method for a bearing ring, having the following steps, the method comprising:
    bringing together a first part-bearing-ring with a second part-bearing-ring;
    inserting at least one securing sleeve into an assembly bore of the first part-bearing ring and into an assembly bore of the second part-bearing-ring; and
    screw-connecting the securing sleeve in at least one of the assembly bore of the first part-bearing ring and the assembly bore of the second part-bearing-ring.

\* \* \* \* \*